United States Patent
Wilson, Jr. et al.

(10) Patent No.: US 7,140,387 B2
(45) Date of Patent: *Nov. 28, 2006

(54) REGULATED GAS SUPPLY SYSTEM

(75) Inventors: Henry Martin Wilson, Jr., Buford, GA (US); Paul Heath Fleming, Sugarhill, GA (US); Corey Howard Metcalfe, Savannah, GA (US)

(73) Assignee: FATS, Inc., Suwanee, GA (US)

( * ) Notice: Subject to any disclaimer, the term of this patent is extended or adjusted under 35 U.S.C. 154(b) by 114 days.

This patent is subject to a terminal disclaimer.

(21) Appl. No.: 10/970,668

(22) Filed: Oct. 21, 2004

(65) Prior Publication Data

US 2005/0115613 A1    Jun. 2, 2005

Related U.S. Application Data

(63) Continuation-in-part of application No. 10/631,944, filed on Jul. 31, 2003.

(51) Int. Cl.
*G05D 16/10* (2006.01)

(52) U.S. Cl. .......................... 137/505.18; 137/505.25; 222/3

(58) Field of Classification Search ........... 137/505.18, 137/505.25; 222/3
See application file for complete search history.

(56) References Cited

U.S. PATENT DOCUMENTS

| | | | | |
|---|---|---|---|---|
| 509,923 | A * | 12/1893 | Locke | 137/489.3 |
| 2,023,497 | A | 12/1935 | Trammell | |
| 2,651,147 | A * | 9/1953 | Eichelman | 137/8 |
| 3,197,144 | A * | 7/1965 | Kochner | 239/308 |
| 3,204,657 | A * | 9/1965 | Boyd | 137/484.8 |
| 3,306,168 | A | 2/1967 | Blumrick | |
| 3,890,999 | A | 6/1975 | Moskow | |
| 4,480,999 | A | 11/1984 | Witherell | |
| 4,678,437 | A | 7/1987 | Scott | |
| 4,823,401 | A | 4/1989 | Gammarino | |
| 4,877,403 | A | 10/1989 | Jurgens | |
| 4,898,205 | A | 2/1990 | Ross | |
| 5,368,022 | A | 11/1994 | Wagner | |
| 5,427,380 | A | 6/1995 | Hazard | |
| 5,569,085 | A | 10/1996 | Igarashi | |
| 5,591,032 | A | 1/1997 | Powell | |
| 5,660,549 | A | 8/1997 | Witts, III | |
| 5,788,500 | A | 8/1998 | Gerber | |
| 5,816,817 | A | 10/1998 | Tsang | |
| 5,823,779 | A | 10/1998 | Muehle | |
| 5,842,300 | A | 12/1998 | Cheshelski | |
| 5,892,221 | A | 4/1999 | Lev | |
| 5,937,563 | A | 8/1999 | Schuetz | |

(Continued)

FOREIGN PATENT DOCUMENTS

DE    24 21 726    11/1975

(Continued)

*Primary Examiner*—Stephen M. Hepperle
(74) *Attorney, Agent, or Firm*—Smith, Gambrell & Russell, LLP

(57) ABSTRACT

A regulated gas supply system having a body defining a pressurized gas reservoir connected to a high-pressure regulator that regulates the high pressure gas from the gas reservoir to disperse the gas at a desired pressure. The gas regulating assembly includes a piston chamber with a piston slidably positioned in the piston chamber, the piston chamber having a secondary chamber connected to the gas reservoir. A spring is positioned between one side of the piston and the piston chamber, with the piston including a piston channel to allow pressurized gas to flow through the piston. Pressure is developed on the piston opposite the spring that is proportional to the force of the spring, providing a balanced piston.

14 Claims, 3 Drawing Sheets

U.S. PATENT DOCUMENTS

| | | |
|---|---|---|
| 5,947,738 A | 9/1999 | Muehle |
| 5,980,254 A | 11/1999 | Muehle |
| 6,041,762 A | 3/2000 | Sirosh |
| 6,112,636 A | 9/2000 | Besselink |
| 6,146,141 A | 11/2000 | Schumann |
| 6,186,168 B1 | 2/2001 | Schultz |
| 6,283,756 B1 | 9/2001 | Danckwerth |
| 6,854,480 B1 * | 2/2005 | Wilson et al. ......... 137/505.18 |
| 2003/0056778 A1 | 3/2003 | Schavone |
| 2003/0101979 A1 | 6/2003 | Schavone |

FOREIGN PATENT DOCUMENTS

| | | |
|---|---|---|
| GB | 846 106 | 8/1960 |

* cited by examiner

REGULATED GAS SUPPLY SYSTEM

FIELD OF THE INVENTION

The present application is a continuation in part of co-pending U.S. patent application Ser. No. 10/631,944, filed on Jul. 31, 2003, entitled "Regulated Gas Supply System."

DESCRIPTION OF PRIOR ART

Because small pneumatically operated devices require a supply of pressurized gas at constant pressure, current technology requires the use of external tanks or compressors in conjunction with a separate gas pressure regulator. In order to supply the regulated gas to the device, either a hose is required from the regulated supply to the inlet port of the device, or the tank and regulator must be externally attached to the device. This requirement limits both usability and portability.

For devices that only require a small volume of gas, a miniature, self-contained, regulated gas supply is desired. Current high-pressure regulators are large and bulky, and require a means of attaching them to a high-pressure gas reservoir. Further, current reservoirs themselves are too large to be practical for use with portable and small pneumatically operated systems.

BRIEF SUMMARY OF THE INVENTION

The present invention is a regulated gas supply system incorporating a high-pressure gas regulator assembly to regulate gas distributed from a pressurized gas reservoir. The system is miniature and self-contained to fit inside any number of small pneumatically operated devices. Furthermore, the regulated gas supply can be designed to facilitate rapid replacement of the entire assembly in order to replenish the gas supply once the reservoir is depleted, and the gas reservoir is easily replenish with gas after being emptied.

BRIEF DESCRIPTION OF THE DRAWING

An apparatus embodying features of the claimed invention are depicted in the accompanying drawing which form a portion of this disclosure and wherein:

DESCRIPTION OF THE PREFERRED EMBODIMENT

Figure 1:
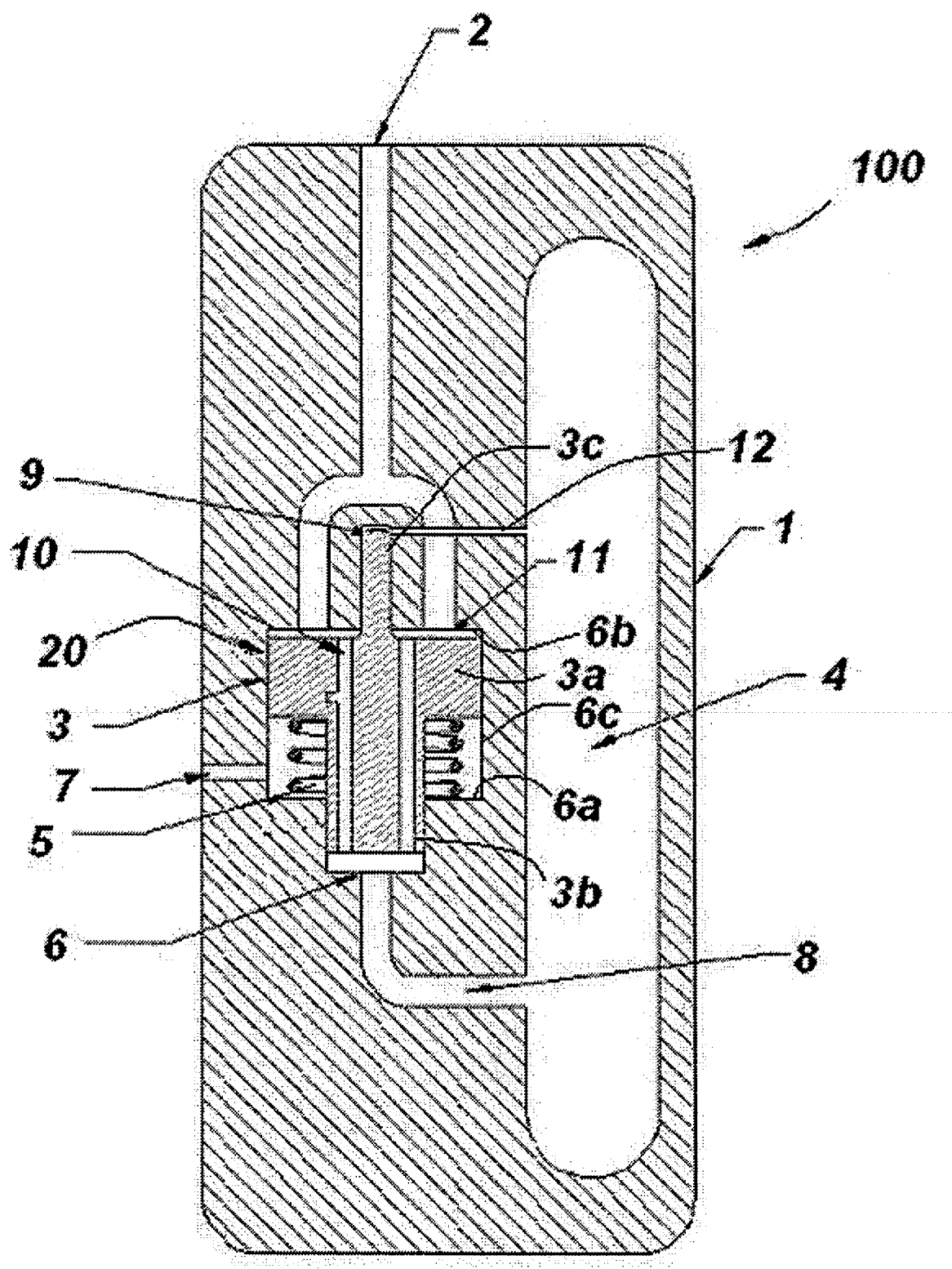
FIG. 1 is a sectional view of the regulated gas supply system comprising a high-pressure reservoir and a balanced regulator assembly including a piston and piston chamber.

Referring to FIG. 1, the gas regulated supply system 100 of the present invention is illustrated. The gas regulated supply system 100 is a miniature and self-contained apparatus. In particular, the gas regulated supply system 100 includes a body 1 or cartridge containing a pressurized reservoir 4 and a gas regulating assembly 20 to control the dispersion of gas from the pressurized reservoir 4.

Figure 2:
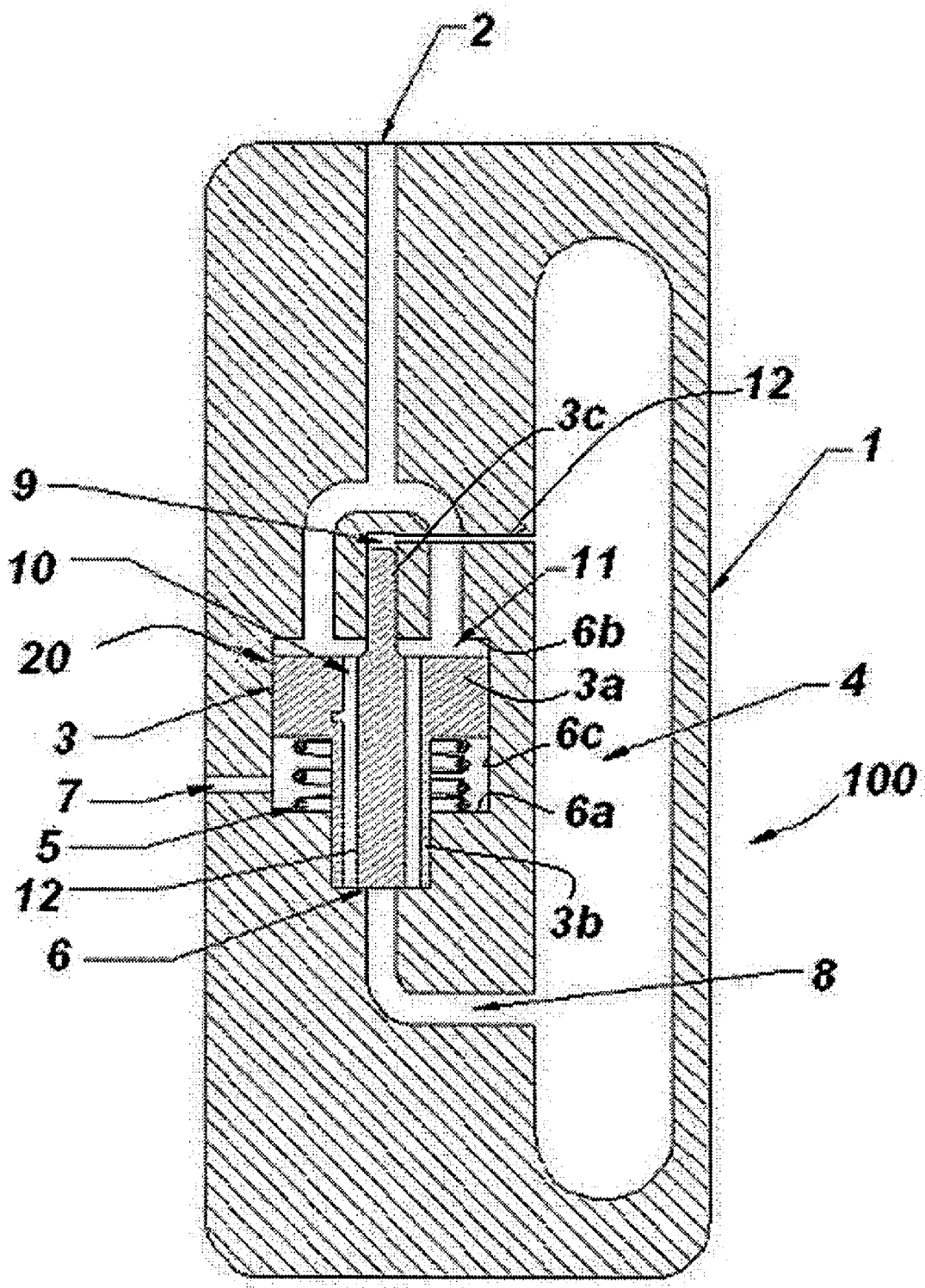
FIG. 2 is a sectional view of the regulated gas supply system as illustrated in FIG. 1, with the piston being forced proximate the chamber seat.

Looking to FIG. 2, the gas regulating assembly 20 includes a piston 3 positioned in a piston chamber 6. The piston 3 includes a piston flange 3a, and the piston 3 is housed in the piston chamber 6 with a spring 5. The piston chamber 6 includes a chamber seat 6a and an uppermost surface 6b opposite said chamber seat 6a, with a chamber wall 6c connecting the chamber seat 6a and the uppermost surface 6b. The spring 5 is positioned between the piston flange 3a and the chamber seat 6a (as shown in FIG. 1). The force of the spring 5 will tend to push the piston 3 away from the chamber seat 6a, thereby allowing gas to flow from inlet passage 8 to piston channel 10, and then out of the body 1 through gas outlet 2.

Comparing FIGS. 1 and 2, as the pressure in the gas outlet 2 increases, pressure will also increase in upper cavity 11 of the piston chamber 6. As the pressure in upper cavity 11 increases, a force develops on the piston 3 proportional to the pressure in upper cavity 11. This pressure in the upper cavity 11 offsets the force of the spring 5, and when the pressure in the upper cavity 11 is great enough, the piston 3 will be forced against the seat 6a (see FIG. 2). When the piston 3 abuts the chamber seat 6a, piston channel 10 within the piston 3 will abut the body 1, thereby blocking further gas flow from the gas reservoir 4 through the piston 3. Furthermore, the piston chamber 6 containing the spring 5 is vented to the atmosphere through vent aperture 7, thus maintaining a constant relationship between regulated pressure and atmospheric pressure.

In order to counteract the force of the high pressure against the portion of the piston 3 that is constantly exposed to the high pressure in the gas reservoir 4, the present design further includes a secondary or balancing chamber 9 that is engaged by one end of the piston 3. In particular, the piston 3 includes a piston body 3b and a piston extension 3c, wherein piston extension 3c engages the secondary chamber 9 in a substantially snug connection. A secondary channel 12 is employed in the body 1 to connect the secondary chamber 9 with the gas reservoir 4. This secondary channel 12 allows the high-pressure gas to flow directly into the secondary chamber 9. The area of the piston 3 acted upon by the gas in secondary chamber 9 is equal to the area of the piston 3 that is constantly exposed to the same high-pressure gas. This arrangement causes the piston 3 to be balanced, so that changes in the pressure of the gas in the reservoir 4, such as when gas is withdrawn during use, or due to temperature changes in the gas, do not affect the regulated pressure at the outlet port 2. The gas pressure at the outlet 2 is therefore proportional to the force of the spring 5. If the force of spring 5 is increased, the regulated pressure is also increased; conversely, if the force of the spring 5 is decreased, the regulated pressure is also decreased. Consequently, the user is able to determine the gas pressure at the outlet 2 as desired for the particular purpose of the gas regulated supply system 100.

Figure 3:
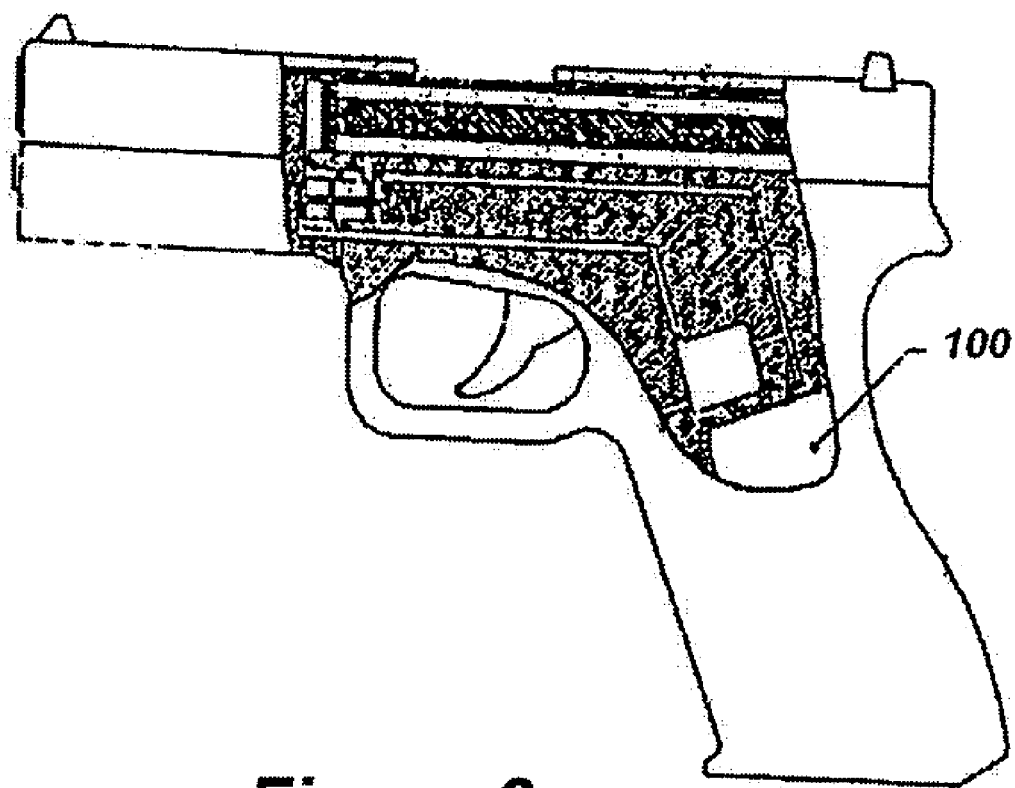
FIG. 3 is a sectional view of the regulated gas supply system of the present invention used in a firearm simulator.

It is foreseen that the present gas regulated supply system 100 can be used in multiple designs of pneumatically operated devices that require a portable supply of pressurized gas at constant pressure for convenient operation of the particular device. In one embodiment, the gas regulated supply system 100 could be used with firearm simulators 30, such as the one illustrated in FIG. 3. In this embodiment, the gas regulated supply system 100 is able to provide the necessary gas at the desired pressure level such that the release of the gas at gas outlet 2 will control the simulated force of the firearm simulator 30 being shot, and it may further provide the necessary force to lock the firearm simulator 30 from further operation.

Thus, although there have been described particular embodiments of the present invention of a new and useful REGULATED GAS SUPPLY SYSTEM, it is not intended that such references be construed as limitations upon the scope of this invention except as set forth in the following claims.

What is claimed is:

1. A gas supply system for distributing highly pressurized gas form from a gas reservoir at a desired pressure, said system comprising:
   a body having a gas inlet in communication with the gas reservoir and a gas outlet;
   a gas regulating assembly defined in said body between said gas inlet and said gas outlet, said gas regulating assembly having a first end proximate said gas inlet and a second end proximate said gas outlet, said first and second ends defining an axis, a piston positioned intermediate said first end and said second end, said piston sliding along a second axis parallel to or coaxial with said first axis; and
   a balancing chamber defined in said body proximate said second end of said gas regulating assembly, said balancing chamber being in communication with the gas reservoir and engaged by said piston.

2. The regulated gas supply system as defined in claim 1 wherein said regulator assembly comprises:
   a piston chamber defined in said body, said piston chamber having an uppermost surface;
   a seat opposing said uppermost surface; and
   a chamber wall between said uppermost surface and said seat;
   said piston slidably positioned in said piston chamber, said piston having a piston flange engaging said chamber wall; and
   a spring between said piston flange and said seat, where said spring urges said piston flange away from said seat.

3. The regulated gas supply system as defined in claim 2 wherein said piston further comprises:
   a piston body abutting said piston chamber; and
   a piston extension connected to said piston body, said piston extension abutting said balancing chamber.

4. The regulated gas supply system of claim 2 further comprising a vent aperture through said body, said vent aperture proximate said spring.

5. A discrete gas regulator for distributing highly pressurized gas at a desired pressure, said regulator comprising:
   a cartridge defining a high-pressure gas reservoir and a gas outlet for dispersing gas at a desired pressure;
   a gas regulating assembly positioned within said cartridge between said gas reservoir and said gas outlet, said gas regulating assembly controlling the pressure of the gas dispersed through said gas outlet from said gas reservoir;
   a piston chamber defined in said cartridge having an uppermost surface, a seat opposing said uppermost surface, and a chamber wall between said uppermost surface and said seat;
   a piston slidably positioned in said piston chamber; and
   a spring between said piston and said seat, where said spring urges said piston away from said seat.

6. A gas regulator for distributing highly pressurized gas from a gas reservoir at a desired pressure, said gas regulator comprising:
   a housing having a gas input and a gas output;
   a piston chamber positioned between said gas input and sad gas output in said housing, said piston chamber having a first surface proximate said gas input and a second surface proximate said gas output;
   a secondary chamber proximate said second surface of said piston chamber, said secondary chamber in communication with the gas reservoir;
   a piston positioned in said piston chamber, said piston having a channel therethrough, and
   a spring positioned between said piston and said first surface of said piston chamber.

7. The regulated gas supply system of claim 6 further comprising a vent aperture through said body, said vent aperture proximate said spring.

8. The regulated gas supply system as described in claim 6 wherein said piston chamber comprises:
   a seat opposing said second surface; and
   a chamber wall between said second surface with said seat.

9. The regulated gas supply system as described in claim 8 wherein said piston comprises:
   a piston body;
   a piston flange abutting said piston body, said piston flange engaging said chamber wall; and
   a piston augmentation extending from said piston body into the secondary chamber.

10. The gas regulating assembly of claim 9, wherein said spring is positioned between said piston flange and said seat to urge said piston flange away from said seat.

11. A gas regulator for receiving a highly pressurized gas from a gas source and distributing the gas at a desired pressure, said regulator comprising:
    a housing having an gas inlet and a gas outlet;
    a piston chamber defined in said housing between said gas inlet and said gas outlet;
    a secondary chamber defined in said housing proximate said piston chamber, said secondary chamber connected with the gas source;
    a piston slidably positioned in said piston chamber to engage said secondary chamber; and
    biasing means for urging said piston flange away from said seat to regulate the pressure of the gas distributed through said gas outlet.

12. The gas regulator as described in claim 11, wherein said piston chamber comprises:
    an uppermost surface,
    a seat opposing said uppermost surface, and
    a chamber wall connecting said uppermost surface with said seat.

13. The gas regulator as described in claim 12, said piston comprising:
    a piston body;
    a flange abutting said piston body and engaging said chamber wall; and
    a piston extension extending from said piston body to engage said secondary chamber.

14. The regulator as described in claim 11, wherein said biasing means comprises a spring.

* * * * *